United States Patent [19]
Davis

[11] 4,064,634
[45] Dec. 27, 1977

[54] MOUNTING OF A MEASURING HEAD FOR POSITIONING RELATIVE TO A STRUCTURE

[75] Inventor: Dan Bryan Davis, Lachine, Canada

[73] Assignee: Northern Telecom Limited, Montreal, Canada

[21] Appl. No.: 698,461

[22] Filed: June 21, 1976

[30] Foreign Application Priority Data
Apr. 30, 1976    Canada .......................... 251517/76

[51] Int. Cl.² ....... G01B 5/04; G01B 5/10; G01B 7/04
[52] U.S. Cl. .............................. 33/147 L; 33/174 L; 33/178 E; 324/260
[58] Field of Search .............. 33/147 L, 174 R, 174 L, 33/178 R, 178 D, 178 E, DIG. 6; 324/34 TK, 34 E

[56] References Cited
U.S. PATENT DOCUMENTS

| | | | |
|---|---|---|---|
| 3,477,134 | 11/1969 | Kuts ................................... | 33/174 L |
| 3,750,294 | 8/1973 | Belke et al. ........................ | 33/147 L |
| 3,766,653 | 10/1973 | McKay, Sr. ........................ | 33/174 L |
| 3,828,248 | 8/1974 | Wennerberg .................... | 324/34 TK |

Primary Examiner—Richard E. Aegerter
Assistant Examiner—Richard R. Stearns
Attorney, Agent, or Firm—Sidney T. Jelly

[57] ABSTRACT

A mounting for a measuring head, particularly for a measuring head riding on a moving surface which can undulate or have surface irregularities, comprises a housing having a recess therein encompassing the center of gravity of the measuring head, and a flexible diaphragm extending across the recess. A support rod is attached at one end to the center of the diaphragm. The other end of the support rod can be mounted for sliding in a direction normal to the plane of the diaphragm, with a damper provided to damp such sliding. The rod can be resiliently urged to an initial position.

8 Claims, 6 Drawing Figures

MOUNTING OF A MEASURING HEAD FOR POSITIONING RELATIVE TO A STRUCTURE

This invention relates to the mounting of a measuring head, relative to a structure, and in particular relates to the mounting of a measuring head relative to an electric cable or similar structure.

A typical need for mounting a measuring head is for measuring the jacket thickness of an electric cable or similar structure. The cable moves continuously relative to the measuring head and it is desirable to mount the head so that it follows undulations of the cable surface and complies with the cable surface in a limited and controlled manner. The head should maintain a predetermined certain orientation and if withdrawn, the head should be capable of being returned in the correct orientation.

The invention provides a mounting for a measuring head which gives good orientation, with a minimum force, the head being stable and free of vibration. Broadly, the invention provides for the measuring head being attached to a support member by a flexible diaphragm. The support member is mounted for sliding in a direction which withdraws the measuring head away from the cable, or other structure, such movement being damped.

The invention will be more readily understood by the following description in conjunction with the accompanying drawings, in which.

Figure 1:
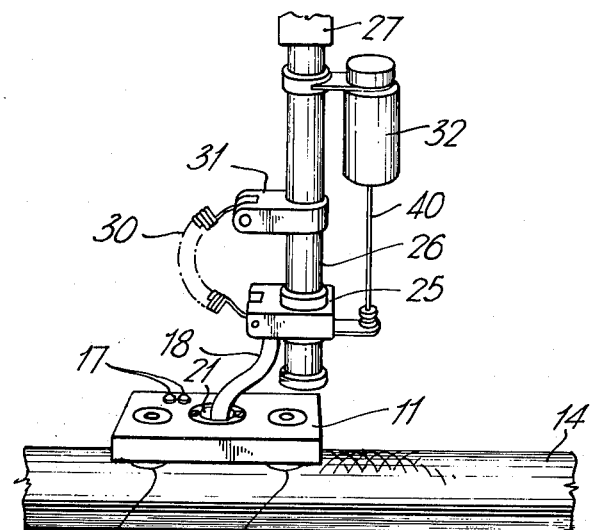
FIG. 1 is a perspective view of a measuring head and associated support structure.
Figure 2:
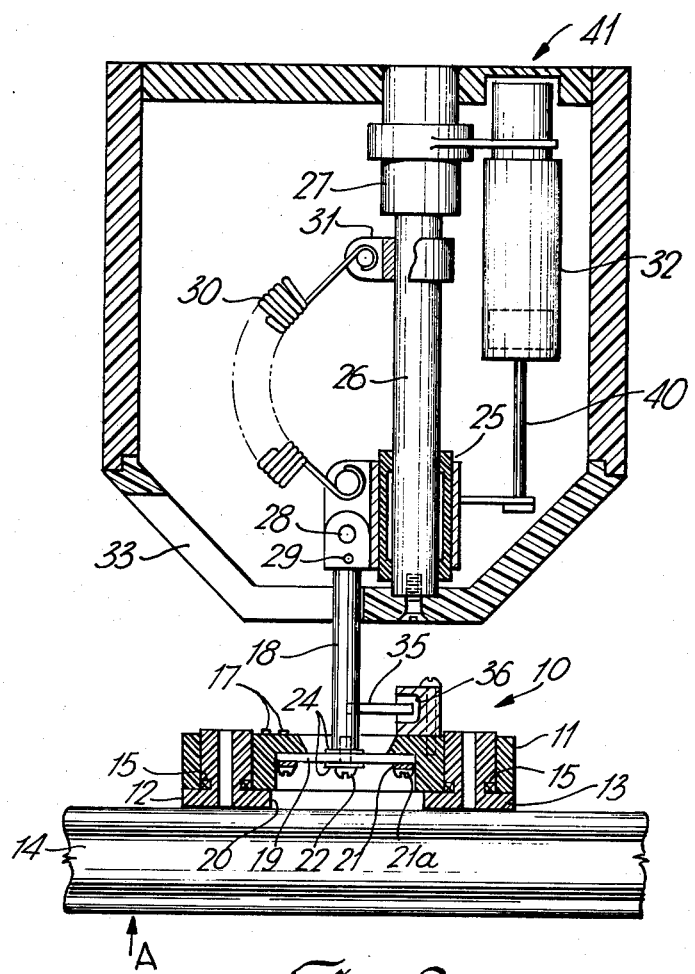
FIG. 2 is a longitudinal cross-section of the head and support structure and housing.
Figure 3:
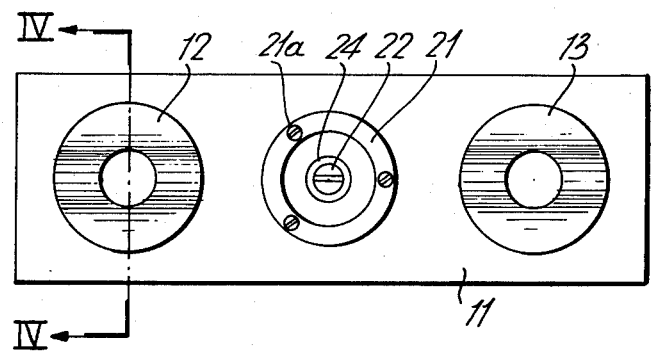
FIG. 3 is a bottom view of the measuring head, in the direction of arrow A in FIG. 2.
Figure 4:
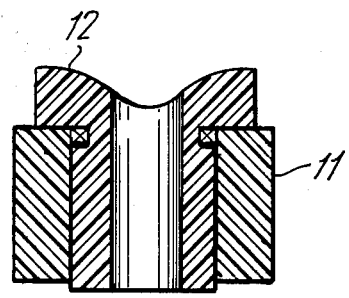
FIG. 4 is a cross-section on the line IV-IV of FIG. 3.

As illustrated in FIGS. 1, 2 and 3, a measuring head 10, comprises an elongated housing 11 having two probes 12 and 13 inserted therein, one at each end of the housing 11. One of the probes is active, that is produces an output signal. In the present example probe 12 is the active one. The other probe 13 is inactive and is provided to give a balanced structure and to provide alignment to the measuring head. The head rests on the structure having a jacket to be measured, for example cable 14. For convenience each probe has a coil 15 formed on its stem 16 but only the coil associated with the probe 12 is incorporated into an oscillator circuit via the terminals 17. Probe 13 can be replaced by other forms of members, the intention of this probe only being for guidance and balance.

The measuring head 10 is attached to a support rod 18 via a flexible diaphragm 19. The diaphragm 19 is held in a circular recess 20 in the housing 11 by a ring 21, ring 21 held in place, in the present example, by small screws 21a, although other means of retaining the ring 21 can be used. A screw 22 passes through the centre of the diaphragm and into a threaded hole in the end of the rod 18. Washers 24 are positioned on either side of the diaphragm. The arrangement is such that the position of attachment of the head to the rod 18 is at the centre of gravity of the head.

The rod 18 is in turn attached to a slider 25 which slides axially on a shaft 26 extending from a main support structure 27. The rod is pivotally attached by pin 28 and held against pivoting by a thin shear pin or wire 29. A spring 30 extends between a fixed bracket 31 and the slider 25 acting to urge the slider towards the outer end of the rod 18. A damper 32 extends between the support structure 27 and the slider 25 and acts to damp movements of the slider.

The diaphragm is of an elastomer, for example neoprene or rubber and provides three degrees of freedom; - pitch, roll and yaw, at the position of connection to the rod 18. It also provides damping and cushioning due to the material used and also due to the general flexing inherant in a diaphragm. The compliance of the diaphragm is limited, that is, it does not allow the head to rotate or flop about and the head is restrained from following the product downstream. When the head is withdrawn from the cable, or other object, the diaphragm maintains the head in the correct orientation and ready for return to the surface of the cable. The compactness of the diaphragm allows the pivot point to be extremely close to the surface with which the measuring head is engaged. This limits the toppling movements which could otherwise cause a lack of stability in the measuring head and lead to hopping and/or vibration.

To prevent an occurrence of overmovement of the head, overflexing the diaphragm, a stop or movement limiting device can be provided. Thus, as seen particularly in FIG. 2, a projection 35 extends radially near the outer end of the rod 18. The end of the projection moves within an enclosure 36 attached to the housing 11. In the event of extreme movement of the head 10 and extreme flexing of the diaphragm 19, the projection 35 contacts the wall of the enclosure 36 and prevents further movement of the head relative to the rod 18.

The characteristics of the diaphragm can be varied by varying thickness, hardness, unrestrained area shape and attachment location of the diaphragm, for example.

The attachment positions of the rod 40 of the damper 32 are in the form of ball and socket joints at each end of the rod to permit easier movement of the slider 25. Also this permits a limited amount of lateral movement of the head.

The measuring head and its mounting structure, in use, are enclosed in a housing 41, for example of plastic material. A typical material is plexiglass. The housing 41 and the support structure 27 provide for mounting of the measuring head on an apparatus. In the event of the shear pin 29 shearing, by some overloading of the measuring head, the head can pivot about pin 28, the rod 18 moving in a slot 33 in the housing 41.

Figure 5:
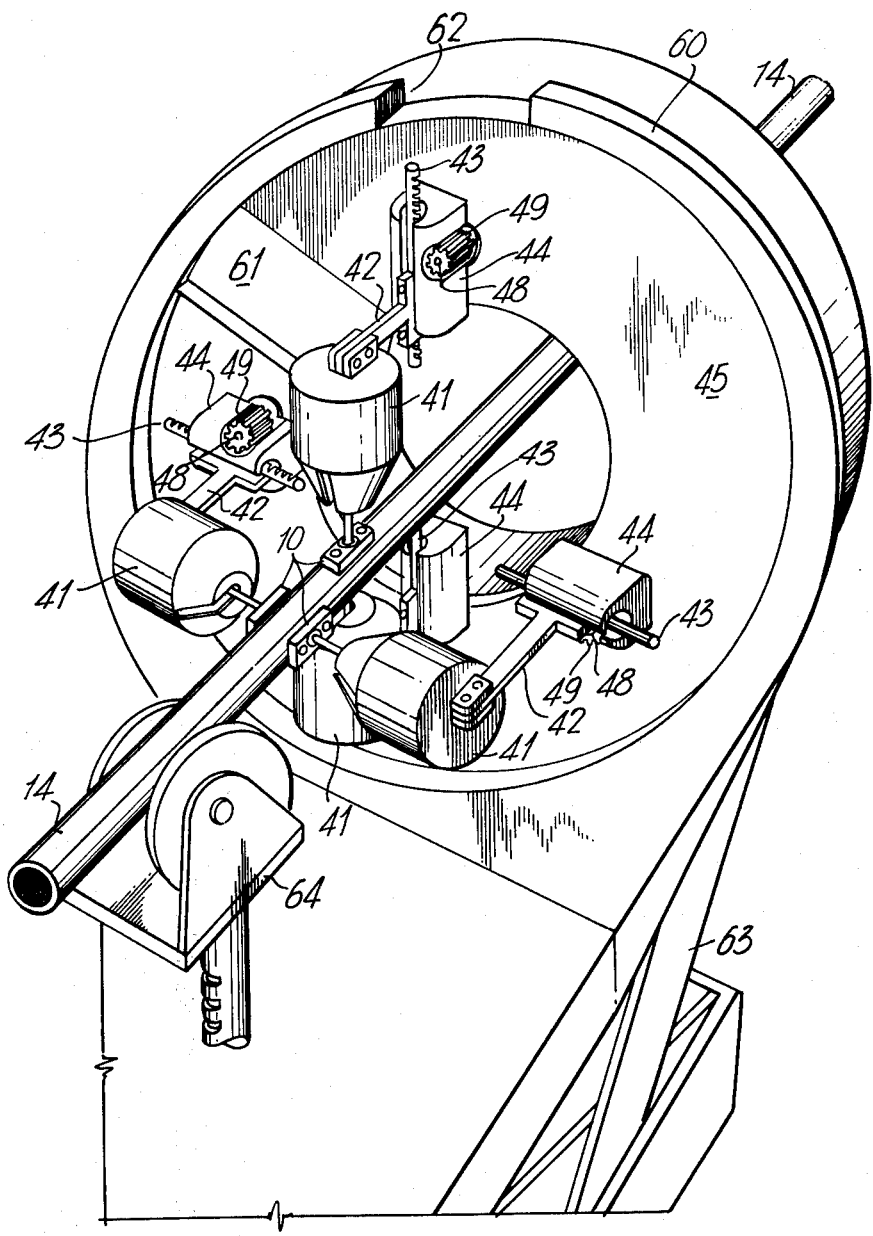
FIG. 5 is a perspective view of an apparatus embodying measuring heads as in FIGS. 1 to 4.

One form of apparatus embodying measuring heads as in FIGS. 1 to 3 is illustrated in FIG. 5. Four measuring heads 10 are provided - only three being seen in FIG. 5. The heads 10 are supported around the cable 14 at 90° intervals. The heads, via the support structures 27 and housings 41 are supported by cantilevers 42 attached to radially slidable racks 43 slidably mounted in brackets 44. Brackets 44 are attached to a structure 45. Extending from the structure 45 are four shafts 48. Each shaft 48 has a pinion 49 on the forward end thereof, the pinions engaging with the racks 43.

Figure 6:
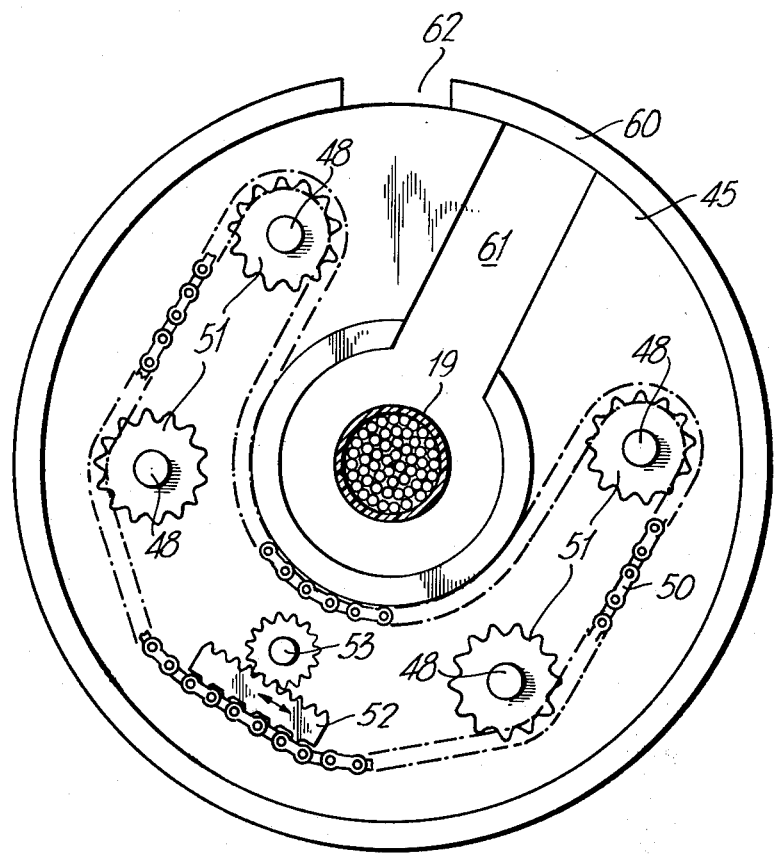
FIG. 6 is an end view on the apparatus in FIG. 5 illustrating the actuation gear.

Each shaft 48 has a chain gear on its rear end with a chain passing over each chain gear and being moved by a sector gear and motor. FIG. 6 illustrates diagrammatically an arrangement of chain 50 and chain gears 51, the sector gear 52 and a chain gear 53 from a motor - not shown. Actuation of the motor rotates the chain gear - in one direction or the other - moving the sector gear 52 and thus chain 50. This in turn rotates the shafts 48 via the gears 51, and in turn rotates pinions 49 to move the racks 43, with the measuring heads 10, radially in or out. Such movement will occur on initial setting up or breaking down of the apparatus, or to avoid a bump in the cable. A bump detector can be provided upstream of the apparatus and arranged to actuate the motor to withdraw the heads 11.

The structure 45 is mounted within an outer ring 60, and can rotate within the ring to a limited extent. A gap 61 is provided in the structure 45 and a similar gap 62 in the ring 60. By aligning the gaps 61 and 62, the whole apparatus can be lowered from around a cable by the support structure 63. It can also, of course, be raised up around a cable. The cable 14 is supported on either side of the structure 45 by movable supports 64, one of which is seen in FIG. 5.

What is claimed is:

1. A measuring head and a mounting therefore, the head having a peripheral rim defining a recess in a bottom surface and including an aperture extending from said recess through to a top surface, the centre of gravity of the measuring head lying within said recess; a diaphragm of elastomeric material in said recess and extending across said aperture; means securing said diaphragm at its periphery to said head; and a support rod extending from said head in a direction away from said bottom surface, said support rod attached at one end to said diaphragm at its centre.

2. A mounting as claimed in claim 1, including a support structure comprising a shaft extending normal to the plane of said diaphragm; a slider on said shaft for axial movement thereon from an initial position; means connecting said support rod at its other end to said slider; damping means operatively connected between said slider and said support structure; and spring means resiliently urging said slider to said initial position.

3. A mounting as claimed in claim 2, said means connecting said support rod to said slider comprising a pivotal connection and a shear member retaining said support rod in a predetermined position.

4. Apparatus for mounting a plurality of measuring heads around an axis, comprising: a support structure around said axis; a plurality of brackets mounted on said support structure, a bracket for each measuring head; each measuring head having a peripheral rim defining a recess in a bottom surface and including an aperture extending from said recess through to a top surface, the centre of gravity of the measuring head lying within said recess; a diaphragm of elastomeric material in said recess and extending across said aperture; means securing said diaphragm at its periphery to said head; and a support rod extending from said head in a direction away from said bottom surface, said support rod attached at one end to said diaphragm at its centre; a shaft extending normal to the plane of said diaphragm, means connecting said shaft at an outer end to said bracket; a slider on said shaft for axial movement thereon; means attaching said rod at its other end to said slider; damping means attached to said slider and said connecting means for damping axial movements of said slider; and means resiliently urging said slider from said outer end of said shaft, each of said shafts extending radially from said axis, said measuring heads being at radially inward positions.

5. Apparatus as claimed in claim 4, said means connecting a shaft at an outer end to a bracket comprising a cantilever, said cantilever connected at one end to said outer end of said shaft and connected at its other end to a related bracket.

6. Apparatus as claimed in claim 5, including a radially slidable rack in each bracket, said cantilevers attached at said other ends to said racks, and means for radially sliding said racks to move said measuring heads radially.

7. Apparatus as claimed in claim 4, including a hollow structure enclosing said shaft and said damping means, said damping means operatively connected between said slider and said hollow structure.

8. Apparatus as claimed in claim 4, said means attaching said support rod to said slider comprising a pivotal connection and a shear member retaining said support rod in a predetermined position.

* * * * *